United States Patent
Eagling et al.

(10) Patent No.: US 10,459,452 B2
(45) Date of Patent: Oct. 29, 2019

(54) METHOD FOR DETECTING A WORKING AREA OF AN AUTONOMOUS WORKING DEVICE, AND A WORKING DEVICE

(71) Applicant: Robert Bosch GmbH, Stuttgart (DE)

(72) Inventors: Thomas Eagling, Norfolk (GB); Steve Fincham, Colchester (GB)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 15/536,893

(22) PCT Filed: Nov. 17, 2015

(86) PCT No.: PCT/EP2015/076762
§ 371 (c)(1),
(2) Date: Jun. 16, 2017

(87) PCT Pub. No.: WO2016/096279
PCT Pub. Date: Jun. 23, 2016

(65) Prior Publication Data
US 2017/0351265 A1    Dec. 7, 2017

(30) Foreign Application Priority Data
Dec. 16, 2014   (DE) .................. 10 2014 226 077

(51) Int. Cl.
*G05D 1/02* (2006.01)

(52) U.S. Cl.
CPC ... *G05D 1/0265* (2013.01); *G05D 2201/0208* (2013.01)

(58) Field of Classification Search
CPC .................. G05D 1/0265; G05D 2201/0208
See application file for complete search history.

(56) References Cited

U.S. PATENT DOCUMENTS

| 5,528,888 A | * | 6/1996 | Miyamoto | ........... A01B 69/008 56/10.2 F |
| 5,774,450 A | * | 6/1998 | Harada | ................. H04L 27/261 370/206 |

(Continued)

FOREIGN PATENT DOCUMENTS

| DE | 10 2005 046 813 A1 | 4/2007 |
| DE | 10 2009 001 900 A1 | 4/2010 |

(Continued)

OTHER PUBLICATIONS

International Search Report corresponding to PCT Application No. PCT/EP2015/076762, dated Feb. 5, 2016 (German and English language document) (5 pages).

*Primary Examiner* — Mary Cheung
(74) *Attorney, Agent, or Firm* — Maginot, Moore & Beck LLP

(57) ABSTRACT

A method for detecting a position of a robotic vehicle relative to a boundary conductor surrounding a defined area includes the steps: providing an electrical current and a pseudo-random boundary signal, generating a current signal using the electrical current and the pseudo-random boundary signal, feeding the current signal into the boundary conductor to produce an alternating electromagnetic field, detecting magnetic field changes which are attributed to the alternating electromagnetic field, and generating a reception signal from the magnetic field changes, evaluating the reception signal with the generation of at least one reconstructed boundary signal, providing a reference signal identical to the pseudo-random boundary signal, carrying out a pattern recognition to determine a correlation value between the reference signal and the reconstructed boundary signal, determining the position inside/outside the defined area based on the determined correlation value. The electrical (Continued)

current and/or the pseudo-random boundary signal is/are amplitude-modulated using a modulation signal.

17 Claims, 6 Drawing Sheets

(56) References Cited

U.S. PATENT DOCUMENTS

| | | | | |
|---|---|---|---|---|
| 5,857,040 | A * | 1/1999 | Bigo | G02F 1/3519 |
| | | | | 372/6 |
| 2003/0076567 | A1* | 4/2003 | Matthews | H04B 10/505 |
| | | | | 398/183 |
| 2007/0225594 | A1* | 9/2007 | Anderson | A61B 5/06 |
| | | | | 600/424 |
| 2008/0039974 | A1* | 2/2008 | Sandin | G05D 1/0225 |
| | | | | 700/258 |
| 2013/0154688 | A1* | 6/2013 | Petereit | A01K 15/023 |
| | | | | 327/72 |

FOREIGN PATENT DOCUMENTS

| | | | |
|---|---|---|---|
| DE | 10 2010 028 251 A1 | 10/2011 | |
| DE | 10 2011 077 673 A1 | 12/2012 | |
| DE | 102014226077 A1 * | 6/2016 | ........... G05D 1/0265 |
| EP | 1 512 053 B1 | 5/2007 | |
| EP | 2 741 160 A1 | 6/2014 | |
| WO | 03/104908 A1 | 12/2003 | |

* cited by examiner

METHOD FOR DETECTING A WORKING AREA OF AN AUTONOMOUS WORKING DEVICE, AND A WORKING DEVICE

This application is a 35 U.S.C. § 371 National Stage Application of PCT/EP2015/076762, filed on Nov. 17, 2015, which claims the benefit priority of Serial No. DE 10 2014 226 077.9, filed on Dec. 16, 2014 in Germany, Disclosures of which are incorporated herein by reference in their entirety.

BACKGROUND

The present disclosure relates to a method for identifying a position of a mobile, in particular autonomous, robotic vehicle relative to a work zone defined by a current-carrying boundary conductor. In particular, the method may be used to execute a function in the robotic vehicle upon a limit of the defined work zone being reached or exceeded. Methods for identifying a position of a mobile robotic vehicle relative to a work zone defined by a current-carrying boundary conductor have already been proposed, for example in DE 10 2010 028 251 A1, EP 2 741 160 A1 and EP 1 512 053 A1.

SUMMARY

Automatic, or at least partly automatic, mobile working devices and/or robotic vehicles, in particular autonomous robotic vehicles such as, in particular, ground-working machines, are normally intended to move automatically within a defined work zone, without leaving the latter. There are multiple known fields of application of autonomous robotic vehicles, for example as autonomous lawnmowers, robotic lawn scarifiers, robotic floor cleaners, robotic snow clearers, robotic cleaners, robotic vacuum cleaners, or other service robots. In the case of robotic vehicles being used outdoors or in other spaces that are not delimited by walls, an outer limit of the work zone that is to be worked may be defined, preferably, by an electric boundary conductor.

The boundary conductor, typically realized in the form of a wire or cable, which marks the outer limit of the zone, carries an electric current, in particular an electric alternating current, an electromagnetic field, in particular a time-variable electromagnetic field, being generated in the surroundings of the boundary conductor. This electromagnetic field, preferably its magnetic component, can be detected by at least one suitable sensor in the autonomous robotic vehicle, and converted into an electrical receive signal. Preferably, a time variation of the electromagnetic field can be detected by means of at least one detection coil, with the generation of an alternating voltage, induced by variation of the magnetic field component. The generated receive signal, in particular an alternating voltage induced in a detection coil, can thereupon be processed and/or evaluated in order to obtain information about the position of the autonomous robotic vehicle relative to the boundary conductor. In particular, such information about the position may be information about whether the robotic vehicle is located inside or outside the zone defined by the boundary conductor. Advantageously, this information may be intended to execute a function of the robotic vehicle in the case of the boundary conductor being reached and/or crossed. In particular, it may be provided, for example, that the autonomous robotic vehicle alters its direction of travel in order not to leave the work zone, and/or that working of the work zone is terminated in the case of exit from the latter.

The electromagnetic field emitted by a current-carrying boundary conductor, in particular its magnetic field strength H, decreases proportionally with radial distance from the boundary conductor and with decreasing current intensity I in the boundary conductor. Consequently, in order for identification of the position of an autonomous robotic vehicle relative to the boundary conductor to be possible also at greater distances from the boundary conductor, there is a need for a high current intensity in the current-carrying boundary conductor. For example, a current intensity having an amplitude of up to 5 A is used to operate a method for identifying the position of an autonomous lawnmower relative to a boundary conductor delimiting a garden, resulting in a time-averaged current intensity of, typically, approximately 3-4 A.

Disadvantageously, in methods of the prior art, the use of high current intensities requires a high power and energy for generating the current signal fed into the boundary conductor. In addition, in extreme cases, interference effects and/or disturbance effects of other electrical devices, in particular other autonomous robotic vehicles, could occur as a result of the use of high current intensities and associated strong electromagnetic fields.

The method according to the disclosure for identifying a position of a mobile, in particular autonomous, robotic vehicle relative to a boundary conductor surrounding a defined zone is based on at least the following steps:

providing an electric current and a pseudo-random boundary signal, generating a current signal by use of the electric current and the pseudo-random boundary signal, feeding the current signal to the boundary conductor, such that an alternating electromagnetic field is generated, detecting magnetic field variations that originate from the alternating electromagnetic field, in particular by means of a voltage induced by magnetic field variations, and generating a receive signal from the magnetic field variations, evaluating the receive signal, with the generation of at least one reconstructed boundary signal, providing a reference signal that is substantially identical to the pseudo-random boundary signal, executing a pattern recognition method, in particular a correlation method, in order to ascertain a correlation value between the reference signal and the reconstructed boundary signal, determining the position inside or outside the defined zone, in dependence on the ascertained correlation value.

According to the disclosure, the electric current and/or the pseudo-random boundary signal are/is amplitude-modulated with a modulation signal, such that the current signal is amplitude-modulated.

In the method according to the disclosure, the zone to be worked by the autonomous robotic vehicle (also work zone) is bounded by a boundary conductor, which is connected to a generator for the purpose of generating a current in the boundary conductor. Upon initiation of a current, in particular an alternating current, in the boundary conductor, a current signal is fed from the generator into the boundary conductor, which current signal generates, in the surroundings of the boundary conductor, an electromagnetic field, in particular a variable electromagnetic field, that corresponds to the current signal. Preferably, the fed-in current signal is generated from a boundary signal that is provided to the current generator by a boundary-signal generator, and that corresponds to a random, in particular pseudo-random, signal sequence.

Advantageously, pseudo-random signal sequences have favorable characteristics in respect of their frequency spectrum, resulting in a high reliability of the method according to the disclosure, even in the case of ambient conditions of intensive disturbance. The signal sequence of the boundary signal in this case may be provided to the current by means of the boundary-signal generator in different, known ways, for example by read-out of a signal sequence from a storage unit, by generation of a signal sequence by means of a random-number generator (in a simple manner, for example, with the aid of a shift register and logic gates, such as, for example, an exclusive-OR gate), or the like. Preferably, the current generator and boundary-signal generator constitute a joint device.

In addition, a reference signal that is substantially identical to the boundary signal is provided to the autonomous robotic vehicle. "Substantially identical" is to be understood to mean that the reference signal and the boundary signal are identical in respect of the information, contained in the signal sequence, that is relevant for executing the pattern recognition method according to the disclosure, in particular the correlation method, but that other parameters, in particular parameters of a signal conversion, such as, for example, an amplitude, assumed values (for example, amplitude 1 of a binary boundary signal in {0,1} and amplitude 2 of a binary reference signal in {0,2}), or the like, may differ.

The reference signal may be provided in the robotic vehicle in different ways, in particular provided to an evaluation unit of the autonomous robotic vehicle, for example by read-out of a signal sequence from a storage unit, by generation of a signal sequence by means of a random-number generator, and/or by transmission of the signal sequence of the boundary signal from the boundary-signal generator by use a data communication interface, particularly preferably by transmission of the signal sequence by use of a wireless data communication interface (Wlan, Bluetooth, radio communication, infrared, etc.).

Magnetic field variations that originate from the electromagnetic field generated by the fed-in current signal in the boundary conductor can be detected by means of a detector unit, and a receive signal can be generated from these detected magnetic field variations. For example, a magnetic field variation, in the form of a voltage in the detection coil that is induced by the magnetic field variation, can be detected by means of the detection coil and provided directly as a receive signal, preferably provided to the evaluation unit, for further processing.

By use of an evaluation method, in particular by means of the evaluation unit of the robotic vehicle, the receive signal can be evaluated, and the boundary signal provided to the current generator can be reconstructed and provided for further processing.

With the aid of a pattern recognition method, in particular with the aid of a correlation method—as described in detail, in particular, in DE 10 2010 028 251 A1—it is ascertained whether the reconstructed boundary signal and the reference signal correlate, i.e. whether their signal sequences are substantially identical or are inverted. Advantageously, this may be realized, for example, with the calculation of the correlation value, particularly advantageously with the ascertainment of a positive/negative sign of a correlation value. The ascertained information, in particular the correlation value, is used to ascertain whether the autonomous robotic vehicle is located inside (in particular, positive correlation value) or outside (in particular, negative correlation value) the zone defined by the boundary conductor. A correlation value in this case is to be understood to mean, in particular, a value that describes a similarity of two signals. The term correlation value in this case relates, not only to a value that is obtained in the course of a correlation method, but also to a value, in the course of any pattern recognition method, that describes the similarity of two signals.

In one embodiment of the method according to the disclosure, a synchronization of the reference signal to the reconstructed boundary signal, or vice versa, may be provided (calculation of the correlation value, with differing time offsets between a reference signal and a reconstructed boundary signal, cf. DE 10 2010 028 251). Upon it being ascertained that the boundary signal and the reference signal correlate, advantageously with the calculation of the correlation value, particularly advantageously with the ascertainment of a positive/negative sign of a correlation value, it is then identified whether the autonomous robotic vehicle is located inside (in particular, positive correlation value) or outside (in particular, negative correlation value) the zone defined by the boundary conductor.

It is pointed out, in particular, that, instead of the correlation method, it is also possible to perform any other pattern recognition method by means of which it can be determined whether the reference signal and the reconstructed boundary signal are substantially identical, i.e. whether, in particular, a signal sequence of the reconstructed boundary signal is substantially identical, i.e. at least almost identical, to the reference signal or to the inverse of the reference signal. Examples for such pattern recognition methods, or pattern recognition routines, are correlation methods, filter methods, fit methods, in particular least-squares methods, search or comparison algorithms, pattern matching methods, or other pattern recognition methods considered appropriate by persons skilled in the art. Preferably, but not in a limiting manner, a correlation method is proposed and presented as an exemplary embodiment, since, by use of the latter, it is possible to realize a pattern recognition that is technically particularly simple, rapid and economically advantageous and that, particularly preferably, can be performed directly and with only a small computing resource requirement, and with only slight demand on an evaluation unit, in particular evaluation electronics, in the mobile robotic vehicle. The method according to the disclosure is also transferrable, however, to other pattern recognition methods and/or routines and/or algorithms. The term correlation value in this case, in particular in respect of other pattern recognition methods, also denotes a value that describes the similarity of two signals.

Advantageously, the correlation method can be executed with only a small computing resource requirement, and with only slight demand on an evaluation unit, in particular evaluation electronics, in the mobile robotic vehicle. Alternatively or additionally, the correlation method may also be executed in another, in particular external, data processing device having an evaluation unit. Preferably, the correlation method is executed using the evaluation unit or a comparable facility of the robotic vehicle and/or of the data processing device that is provided for executing the correlation method.

Particularly advantageously, the pattern recognition method, in particular the correlation method, enables a position of the robotic vehicle relative to the boundary conductor to be determined as soon as the autonomous robotic vehicle is switched on, without prior teaching.

Particularly advantageously, in the method according to the disclosure, the provided electric current and/or the pseudo-random boundary signal is amplitude-modulated with a modulation signal. "Amplitude-modulated" in this case is to be understood to mean that a time-dependent signal, in this case the pseudo-random boundary signal or the electric current to be fed into the boundary conductor, is overlaid and or modified by means of a time-dependent function, in particular a signal conversion of a time dependent function, in such a manner that the resultant signal has an altered time-dependent amplitude characteristic in comparison with the original, unmodulated, signal. Preferably, this modulation may be obtained by addition, multiplication, by convolution, by exponentiation and/or by another appropriate mathematical operation, from the original signal and the modulation signal. Preferably, the amplitude modulation is effected directly in the boundary-signal generator and/or in the current generator. In particular, the boundary signal may also be generated directly as a pseudo-random signal sequence, without amplitude modulation, but it can nevertheless be described as an amplitude-modulated signal sequence—from a signal sequence overlaid and/or modified with a time-dependent function, in particular generated in an amplitude-modulated manner—in this case.

In this case, the use of the pure pseudo-random boundary signal and/or its encoding, for example in the context of a Manchester encoding, does not constitute amplitude modulation within the meaning of the disclosure. It is only with overlaying of the, in particular encoded, pseudo-random boundary signal and/or the electric current with a modulation signal that the amplitude-modulated boundary signal according to the disclosure, or an amplitude-modulate current according to the disclosure, is produced.

According to the disclosure, and independently of the realization, there is thus fed into the boundary conductor a time variable current signal whose current intensity is modulated in a time-dependent manner as a consequence of the amplitude modulation, either of the electric current itself or of the boundary signal on which the signal conversion is based. Consequently, the electromagnetic field generated by the flow of current in the conductor is likewise modulated in its intensity in a time-dependent manner.

Preferably, during operation, the resultant amplitude-modulated current signal is fed continuously, i.e., in particular, without interruptions and/or pauses, into the boundary conductor.

Owing to the amplitude modulation, it is possible, particularly advantageously, to modify the mean current fed into the boundary conductor, and consequently also to influence, in particular to modify, the (transmitting) power, the energy with which the electromagnetic field is generated, and the range of the generated electromagnetic field.

In an advantageous embodiment of the method according to the disclosure for identifying a position of a mobile robotic vehicle relative to a boundary conductor surrounding a defined zone, the modulation signal has at least one first signal portion that has a first amplitude, and a second signal portion that has a second amplitude, wherein the first amplitude differs from the second amplitude by a factor that, in particular, is greater than 10, preferably greater than 100, particularly preferably greater than 120.

It is thus achieved, advantageously, that the resultant amplitude-modulated current signal fed into the boundary conductor is divided into at least two signal portions, the amplitudes of which differ, in particular by a factor greater than 10, preferably by a factor greater than 100, particularly preferably by a factor greater than 120. Owing to the at least two signal portions of differing amplitude, the electromagnetic field generated by the flow of current in the boundary conductor likewise has physical properties that vary with time, in particular in respect of field strength, flux density, power density, energy density and the like, as well as the time-dependent variation thereof. In particular, the time-dependent variations of these characteristics can likewise be divided into the same number of signal portions. In this way, particularly advantageously, it is possible to generate electromagnetic fields that, in a signal strength that can be transmitted by the electromagnetic field—and consequently in their geometric range—can be divided into the same number of signal portions as the modulation signal on which the amplitude modulation is based. In this way, a time-dependent range modulation of the signal to be transmitted with the generated electromagnetic field can be realized in a particularly advantageous and simple manner. High-amplitude signal portions of the current signal fed into the boundary conductor generate long-range electromagnetic fields, whereas low-amplitude signal portions generate short-range electromagnetic fields.

In addition, an amplitude modulation may also be effected by means of a modulation signal that, in particular, has more than two signal portions, such that more than two reach ranges of the signal to be transmitted can be realized in a time-dependent manner.

Particularly advantageously, with an amplitude modulation according to the disclosure, it is possible to ensure identification of the position of the mobile robotic vehicle, relative to the boundary conductor, in a large (geometrical) zone, with advantageous reduction, adaptation and/or optimization of the mean energy and/or power required to generate the electromagnetic field.

"Adapted" and "optimized" are to be understood to mean, in particular, that the electromagnetic fields, and the energy and/or power required to generate them, can be adapted to limiting geometrical and/or physical conditions of the respective field of application of the mobile robotic vehicle, or can be optimized in respect thereof. Preferably, for example, a maximum energy and/or power for generating the electromagnetic field, i.e. the current signal fed into the boundary conductor, can be reduced if the mobile robotic vehicle is located in a zone of comparatively small area, i.e. at any given time is at a comparatively short distance from the boundary conductor. An alteration, in particular a reduction and/or optimization, of the maximum energy and/or power can be realized, particularly advantageously, by alteration of the amplitudes of the signal portions and/or of the durations thereof.

Differing time variable electromagnetic fields are detected, depending on a current distance of the mobile robotic vehicle from the boundary conductor. At a relatively large distance, the detector unit of the robotic vehicle can detect only the long-range electromagnetic fields (high amplitude of the amplitude-modulated current signal in the boundary conductor), which are interrupted by the short-range signal portions (low amplitude of the current signal in the boundary conductor), whereas, at a relatively short distance from the boundary conductor, in particular in the immediate surroundings of the boundary conductor, the entire time-dependent signal characteristic, consisting of signal portions of high and low signal strength, can be detected.

In an advantageous embodiment of the method according to the disclosure for identifying a position of a mobile robotic vehicle relative to a boundary conductor surrounding a defined zone, the first signal portion of the modulation signal is of a shorter duration than the second signal portion of the modulation signal, in particular shorter by a factor 5, preferably shorter by a factor 10, particularly preferably shorter by a factor 17.

It is thereby made possible to specify a time sequence, in particular in the case of a periodic modulation signal, a frequency and/or periodicity of the current signal that is fed into the boundary conductor and on which the generation of the electromagnetic field is based. Along with this, a mean energy and/or power required to generate the electromagnetic fields can be varied, in particular adapted, in particular reduced or increased, preferably optimized.

Preferably, a high-amplitude signal portion of the current signal fed-in on the boundary conductor can be of a comparatively short duration, whereas a low-amplitude signal portion of this current signal can be of a comparatively long duration. In this way, the identification of the position of the mobile robotic vehicle, relative to the boundary conductor surrounding the defined zone, can be ensured in a large (geometrical) zone, with further advantageous reduction of the mean energy and/or power required to generate the electromagnetic field. The long-range electromagnetic fields—and also the signal transmitted thereby—are limited to signal portions of comparatively short duration, with short-range electromagnetic fields being generated during comparatively longer time periods. Particularly advantageously, besides the reduction of the energy and/or power required to operate the mobile robotic vehicle, a reduction in interference effects, in particular disturbing interferences, is achieved—with a complete signal coverage being maintained over the entire zone defined by the boundary conductor.

Advantageously, durations of the signal portions can be adapted according to a desired and/or required mean energy and/or power, in particular, for example, specified by a size of the working surface area, by a required minimum signal duration and/or signal intensity for reliable identification of the position, by a maximally allowable energy emission of the system, or the like.

In an advantageous embodiment of the method according to the disclosure for identifying a position of a mobile robotic vehicle relative to a boundary conductor surrounding a defined zone, the electric current and/or the pseudo-random boundary signal are/is amplitude-modulated with a periodic modulation signal.

In particular, in this way an amplitude modulation can be realized in a simple and economically viable manner. In addition, a frequency of a periodically amplitude-modulated signal may be used as an additional identification of the boundary signal, for example in the context of differentiating and/or filtering boundary signals that are transmitted from boundary conductors located close to one another.

In an advantageous embodiment of the method according to the disclosure for identifying a position of a mobile robotic vehicle relative to a boundary conductor surrounding a defined zone, the modulation signal corresponds, at least partly, to a step function, a rectangle function, another, in particular discontinuous, function, or a signal approximation of one of these functions.

According to the disclosure, in particular functions, or signal approximations of functions, that have steeply rising and/or falling flanks are of interest as a modulation signal. "Steep" is to be understood to mean, in particular, that the time variation of the amplitude of the modulation signal in the course of such a flank is substantially shorter than the duration of the corresponding signal portion of the modulation signal, in particular shorter than $1/10$ of this duration, advantageously shorter than $1/100$ of this duration, particularly advantageously shorter than $1/1000$ of this duration of the corresponding signal portion. Preferably, functions, or signal approximations of functions, that have quasi-instantaneous amplitude variations are of interest as a modulation signal, as is the case, in particular, with discontinuous mathematical functions such as, in particular, with the step function, the rectangular function, the staircase function or the (Heaviside) step function.

"Signal approximations of functions" mean, in particular, signal conversions of the functions, for example as current, voltage or other technical quantity, that are typically continuous, and whose time progression therefore typically does not exactly match the theoretical mathematical function (owing to time lags, capacitances and/or inductances in a generating device, or the like). In particular, "signal conversions" are frequently better described by means of a functional approximation, for example by means of linear combinations of a plurality of functions, preferably continuous functions, for example nth-degree polynomials, trigonometric functions, or the like.

Alternatively and/or additionally, therefore, high-degree polynomials, summation functions, trigonometric functions, exponential functions, Fourier series, or the like, as well as combinations and/or mathematical concatenations of such functions, or signal approximations of such functions, are also conceivable as a modulation signal, and more suitable from a practical perspective. The incomplete and exemplary list of examples for modulation signal may be supplemented by any, in particular discontinuous, functions or signal approximations of these functions that are considered appropriate by persons skilled in the art.

The number of amplitudes present in the amplitude-modulated signal can be defined through the appropriate selection of a modulation signal on which the amplitude modulation is based: whereas, for example, the rectangular function varies between two amplitudes, a staircase function or a sum of step functions advantageously allows a variation of the resulting amplitude-modulated signal between more than two amplitudes.

In an advantageous embodiment of the method according to the disclosure for identifying a position of a mobile robotic vehicle relative to a boundary conductor surrounding a defined zone, the time-dependent modulation signal is other than zero.

The modulation signal is always other than zero, either positive or negative, and therefore has, in particular, no pauses and/or quiescent periods.

In an advantageous embodiment of the method according to the disclosure for identifying a position of a mobile robotic vehicle relative to a boundary conductor surrounding a defined zone, the modulation signal is selected in such a manner that the current signal provided in the boundary conductor is on average less than a defined value, in particular less than 1000 mA, preferably less than 800 mA, particularly preferably less than 500 mA.

By appropriate selection of the modulation signal, in particular in respect of the amplitudes described by the modulation signal and their durations, it is possible to realize a desired mean current, a mean energy and/or a mean power of the current signal that is fed into the boundary conductor and required for generation of the electromagnetic field. Advantageously, the mean power that is applied during the operation of the autonomous robotic vehicle for the purpose of executing the method for identifying the position is reduced, in order to save energy and to reduce or avoid interference signal and/or disturbance signals. According to the disclosure, reliable identification of the position of the mobile robotic vehicle, relative to the boundary conductor surrounding the defined zone, is possible despite a reduced transmitting or operating power. Preferably, a target value of under 500 mA is used for the mean current signal in order, advantageously, to preclude interference to other robotic vehicles, in other zones, in the surroundings of the zone defined by the boundary conductor.

In an advantageous embodiment of the method according to the disclosure for identifying a position of a mobile robotic vehicle relative to a boundary conductor surrounding a defined zone, the pseudo-random boundary signal is a binary signal having a quasi-random sequence of binary levels, and has a, in particular periodic, bit pattern that is selected such that a length of a portion of the, in particular periodic, bit pattern, that is identical to a portion of the inverted bit pattern of equal length, is less than a predefined proportion with respect to the total length of the bit pattern.

Advantageously, a binary boundary signal can be generated in a simple manner, for example with the aid of a shift register and logic gate, e.g. an exclusive-OR gate.

What is important for periodic pseudo-random boundary signals that are used, in particular for periodic pseudo-random binary boundary signals, is that, in the case of a periodic repetition of the random signal pattern of the boundary signal, no portions of the signal pattern are identical to portions of the inverse signal pattern, in which logic levels of the signal pattern are respectively inverted. In order to achieve a sufficient discrimination within the pattern recognition method, in particular the correlation method, the length of the portion of the signal pattern that is identical to the inverse signal pattern must not exceed a predefined portion, relative to the length of the total signal pattern. In this way, it can be ensured that it is always possible, irrespective of the signal sequence of the boundary signal, to determine the position of the mobile robotic vehicle relative to the boundary conductor surrounding the defined zone, i.e. a position inside or outside this boundary conductor, by means of the pattern recognition method, in particular by means of the correlation method, in particular the determination of the correlation value between the reference signal and the reconstructed boundary signal.

In an advantageous embodiment of the method according to the disclosure for identifying a position of a mobile robotic vehicle relative to a boundary conductor surrounding a defined zone, the pseudo-random boundary signal is a Manchester-encoded binary signal having a quasi-random sequence of binary levels, and has a, in particular periodic, bit pattern, in particular a periodic 5-bit bit pattern, wherein the timing frequency is, in particular, 5 kHz.

As a result of Manchester encoding, a rising flank, in particular a zero/one sequence or a minus-one/one sequence of the binary boundary signal, is assigned, for example, to a logical zero, whereas a falling flank, in particular a one/zero sequence or a one/minus-one sequence of the binary boundary signal, is assigned, for example, to a logical one. It can thus be realized, in a simple manner, that there are always level changes present for the purpose of timing recovery in the context of the reconstruction of the boundary signal, and the resulting Manchester-encoded binary signal constitutes a pure digital binary signal. Moreover, advantageously, by means of Manchester encoding the bandwidth of the binary bit pattern is reduced.

In an advantageous embodiment of the method according to the disclosure for identifying a position of a mobile robotic vehicle relative to a boundary conductor surrounding a defined zone, the pseudo-random boundary signal is reset after a time period that corresponds to the phase length of the modulation signal.

"To reset the boundary signal" is to be understood to mean, in particular, that the time-dependent characteristic of the boundary signal that, according to the method, is fed, as an amplitude-modulated current signal, into the boundary conductor by a current generator, starts over after a time period that corresponds to the phase length of the modulation signal. For example, this reset may be effected parallel to the rising flank of the high-amplitude signal portion of the modulation signal, such that, upon commencement of each high-amplitude signal portion, in particular with each periodically recurring high-amplitude signal portion, the boundary signal likewise starts anew.

Advantageously, on the basis of this condition, it is possible to dispense with synchronization of the reference signal to the reconstructed boundary signal, or vice versa (calculation of the correlation value, for various time offsets, between a reference signal and a reconstructed boundary signal), since a time synchronization is already effected with the phase length of the modulation signal. For example, the commencement of the boundary signal may be indicated with each rising flank of the high-amplitude signal portion. Particularly advantageously, a technically simple, rapid and economically advantageous pattern recognition can be realized in this way. In particular, the pattern recognition can be performed with a particularly small computing resource requirement, and with only slight demand on an evaluation unit, in particular evaluation electronics, in the mobile robotic vehicle.

In an advantageous embodiment of the method according to the disclosure for identifying a position of a mobile robotic vehicle relative to a boundary conductor surrounding a defined zone, the time correlation offset between the reference signal and the reconstructed boundary signal is ascertained in that a plurality of correlation values are determined, for various time offsets, and the time correlation offset is determined as the time offset for the correlation value that is greatest in amount.

In this way, by comparison of the results from the correlation values, for example by means of a maximum search or consideration of threshold values, it is possible to determine a time shift, between the reference signal and the reconstructed boundary signal, as a time correlation offset, and to realize a synchronization of the two signals by time-shifting one of the signals. In particular, a correlation offset, once calculated, may also be used to calculate other correlation values.

In an advantageous embodiment of the method according to the disclosure for identifying a position of a mobile robotic vehicle relative to a boundary conductor surrounding a defined zone, at least one function is triggered at the mobile robotic vehicle in dependence on the ascertained position relative to the boundary conductor, in particular in the case of exit from the zone defined by the boundary conductor.

In this way, the position of the robotic vehicle is linked to its functionality, in respect of the zone to be worked. Various embodiments are conceivable, in which a function of the robotic vehicle, in particular a function in connection with its navigation and/or its execution of works, is influenced according to the ascertained position of the robotic vehicle. A multiplicity of such functions are conceivable, and could realize, for example, a change of direction, in particular a reversal of direction, in the case of the boundary conductor being reached, switching-on or switching-off of the work operation in the case of crossing of the boundary conductor, the emission of information in dependence on the position, or the like.

In an advantageous embodiment of the method according to the disclosure for identifying a position of a mobile robotic vehicle relative to a boundary conductor surrounding a defined zone, movement of the mobile robotic vehicle is only allowed inside the zone surrounded by the boundary conductor and, in the case of the boundary conductor being reached, a change of direction of the mobile robotic vehicle is effected.

Advantageously, the movement scope of the mobile robotic vehicle is thus limited to the zone defined by the boundary conductor. Also conceivable is an emergency-stop function that terminates further travel and/or a working function of the robotic vehicle if a change of direction of the robotic vehicle, back into the zone (alternatively, out of the zone), is unsuccessful. Thus, for example, a robotic vehicle performing work on a work area can interrupt its work and/or its further travel if the robotic vehicle is outside (alternatively, inside) of the boundary conductor for at least a defined duration, e.g. because of a technical breakdown, an obstacle, a declining capability of the power supply of the robotic vehicle, or the like.

In an advantageous embodiment of the method according to the disclosure for identifying a position of a mobile robotic vehicle relative to a boundary conductor surrounding a defined zone, the mobile robotic vehicle executes a change of direction, in the direction of the boundary conductor, if the position of the robotic vehicle relative to the boundary conductor is identified as being inside or outside the zone.

"Change of direction, in the direction of the boundary conductor" is to be understood to mean, in particular that the robotic vehicle, after crossing over the boundary conductor, executes a turn, in such a manner that it subsequently moves back toward the boundary conductor, in particular at an angle in relation to the boundary conductor that is preferably not perpendicular to the boundary conductor, such that, upon a repeated change of direction, in the direction of the boundary conductor, a zigzag movement of the robotic vehicle along the boundary conductor is consequently effected.

In this way, the robotic vehicle can easily effect tracking of the boundary conductor defining the zone, as is effected, for example, for the purpose of ascertaining the zone, in particular the limits thereof, in the context of mapping the zone. Particularly advantageously, the time-dependent electromagnetic field generated in the boundary conductor by the current signal, in particular the long-range and short-range signal components thereof, can be detected entirely without interruptions when the robotic vehicle is in direct proximity to the boundary conductor, such that tracking of the boundary conductor in a particularly precise manner, and with a high time resolution (without interruptions). As a result, advantageously, the edge of the zone can be determined very precisely, such that, for subsequent work steps of the robotic vehicle, reliable working can be achieved up to this edge.

Also proposed according to the disclosure is a mobile, in particular autonomous, robotic vehicle that, according to the method according to the disclosure, identifies its position relative to a boundary conductor surrounding a defined zone, and that has, at least:

- a detector unit, for detecting a varying magnetic field, generated by a fed-in current signal in a boundary conductor by use of a provided pseudo-random boundary signal, and for generating a receive signal from a detected magnetic field variation,
- a reference-signal generator, for providing a reference signal having a bit pattern that is substantially identical to that of the provided boundary signal,
- an evaluation unit, which is designed to generate a reconstructed boundary signal by use of the receive signal, to execute a pattern recognition method, in particular a correlation method, in order to ascertain a correlation value between the reference signal and the reconstructed boundary signal, and to determine a position relative to the boundary conductor, in particular a position inside or outside the zone surrounded by the boundary conductor, in dependence on the ascertained correlation value.

The detector unit is intended to detect magnetic field variations that originate from the electromagnetic field generated by the fed-in current signal in the boundary conductor, and to generate a receive signal from these detected magnetic field variations. For example, a magnetic field variation, in the form of a voltage in the detection coil that is induced by the magnetic field variation, can be detected by means of the detection coil and provided directly as a receive signal, in particular provided to the evaluation unit, for further processing. Alternatively and/or additionally, another device for detection of a magnetic field variation, considered appropriate by persons skilled in the art, may be used, for example Hall sensors, magnetoresistors (magnetic dependent resistor (MDR)), magnetometers, Kerr magnetometers, proton magnetometers, SQUIDs, or the like.

"Intended" is to be understood to mean, in particular, specially "programmed", "designed" and/or "equipped". That an object is "intended" for a particular function is to be understood to mean, in particular, that the object fulfills and/or executes this particular function in at least one application state and/or operating state.

The reference-signal generator for providing the reference signal may be realized in different ways, in particular in the form of a random-number generator (in a simple manner, for example, with the aid of a shift register and logic gates, such as, for example, an exclusive-OR gate), or as a device that reads out from a storage unit and that, following read-out from the storage unit of a signal sequence having a bit pattern that is substantially identical to that of the provided boundary signal, provides the reference signal. Alternatively, the reference signal may also be transmitted, in particular transmitted wirelessly, by the boundary-signal generator, by means of a data communication interface.

An evaluation unit for evaluating receive signals supplied by the detector unit is to be understood to mean, at least, a device that has an information input for accepting the receive signals of the detector unit, an information processing unit for processing, in particular evaluating, the accepted receive signals, and an information output for forwarding the processed and/or evaluated receive signals. Advantageously, the evaluation unit has components that comprise, at least, a processor, a storage and an operating program having evaluation and calculation routines. In particular, the electronic components of the evaluation unit may be disposed on a circuit board (printed circuit board), preferably on a common circuit board with the control device, particularly preferably in the form of a microcontroller. In particular, the evaluation unit may also be realized as a constituent part of a control device of the autonomous robotic vehicle. The evaluation unit is intended to reconstruct the boundary signal from receive signals obtained from the detector unit, to execute a pattern recognition method, in particular a correlation method, between the reconstructed boundary signal and a reference signal, and to effect therefrom an identification of the position of the robotic vehicle in respect of the boundary conductor defining the zone.

The mobile robotic vehicle additionally has a control device for controlling the various components of the robotic vehicle. The control device is to be understood to mean, in particular, a device having at least one control electronics that has means for communicating with the other components of the robotic vehicle, for example means for controlling, by open-loop and closed-loop control, the detector unit, the evaluation unit, a drive unit, and/or means or data processing, and/or other means considered appropriate by persons skilled in the art. In particular, the control device is intended to set at least one operating-function parameter of the robotic vehicle, in particular regarding a navigation and/or a movement of the robotic vehicle, in dependence on at least one detected signal variable and/or one evaluation result of the evaluation unit.

Advantageously, the control electronics of the control device according to the disclosure may be understood to mean a processor unit in combination with a storage unit, and with an operating program, stored in the storage unit, that is executed during the control operation. I particular, the electronic components of the control device may be disposed on a circuit board (printed circuit board), preferably in the form of a microcontroller. Particularly advantageously, the control device may furthermore be intended to control the entire robotic vehicle and to enable the operation thereof. For this purpose, the control device is intended to communicate with the other components of the robotic vehicle, in particular the detector unit, the evaluation unit, the drive unit, a storage unit, a data communication interface, and the like.

Additionally proposed according to the disclosure is a system for executing the method according to the disclosure, in particular for identifying a position relative to a boundary conductor surrounding a defined zone, which comprises, at least:

a boundary conductor,
a mobile robotic vehicle according to the disclosure,
a signal generator for feeding a current signal into the boundary conductor.

In particular, the signal generator may comprise a boundary-signal generator and a current generator, or be realized as a combination of such.

In an advantageous embodiment of the system according to the disclosure, the signal generator is intended to provide a current signal in the boundary conductor that surrounds the defined zone, according to a provided pseudo-random boundary signal, wherein the current signal is amplitude-modulated.

BRIEF DESCRIPTION OF THE DRAWINGS

The disclosure is explained in greater detail in the description that follows, on the basis of exemplary embodiments represented in the drawings. The drawing and the description contain numerous features in combination. Persons skilled in the art will also expediently consider the features individually and combine them to create appropriate further combinations. In the figures, elements that are the same are denoted by the same references.

There are shown in.

DETAILED DESCRIPTION

The method according to the disclosure and a subject according to the disclosure related in general to mobile robotic vehicles that are designed to ascertain whether they are inside or outside a defined zone. In particular, these mobile robotic vehicles may be intended to performs works and/or monitoring tasks. Examples of such mobile robotic vehicles are constituted by automatic or semi-automatic work appliances that are suitable for performing ground work in a defined zone, such as, for example, lawn mowing, lawn scarifying, collecting foliage, watering, applying fertilizer, clearing snow, vacuum-cleaning, floor wiping, floor washing, floor polishing, and the like.

The following description of the exemplary embodiments of the disclosure relates to an automatic, autonomous mobile robotic vehicle, in particular a robotic lawnmower, wherein the disclosure is not limited to such a system.

Figure 1:
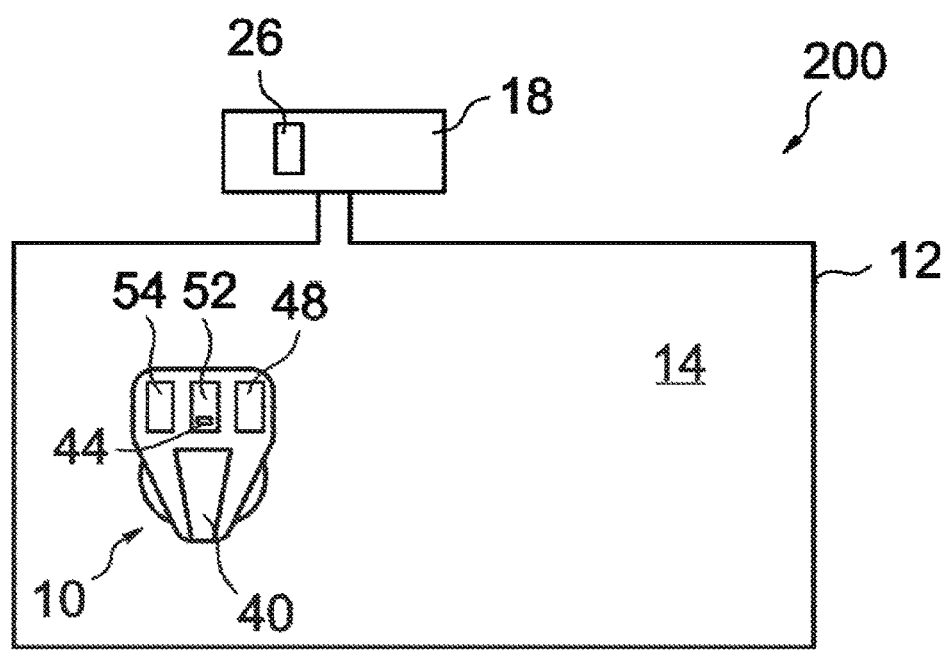
FIG. 1 a schematic representation of an embodiment of a system according to the disclosure, composed of a boundary conductor, mobile robotic vehicle and signal generator, FIG. 2 a schematic representation of an alternative embodiment of a system according to the disclosure, composed of a boundary conductor, mobile robotic vehicle and signal generator, wherein the boundary conductor defines a zone that leaves out an inner piece, FIG. 3 a perspective representation of a design of a mobile robotic vehicle according to the disclosure, FIG. 4 a simplified exemplary representation of time characteristics of
(a) a periodic binary boundary signal,
(b) a modulation signal,
(c) an amplitude-modulated current signal fed into a boundary conductor,
(d) the magnetic field strength to be measured by the detector unit of the mobile robotic vehicle,
(e) a reconstructed boundary signal, such as that which results when the robotic vehicle is in direct proximity to the boundary conductor,
(f) a reconstructed boundary signal, such as that which results when the robotic vehicle is at a greater distance from the boundary conductor, and
(g) a reference signal provided by a reference-signal generator of the mobile robotic vehicle, FIG. 5 a schematic representation from FIG. 1, wherein the mobile robotic vehicle is located (a) at the edge and (b) inside the zone defined by the boundary conductor, FIG. 6 a flow diagram to represent an embodiment of the method according to the disclosure for identifying a position of a mobile robotic vehicle with respect to a boundary conductor that defines a zone.
Figure 2:
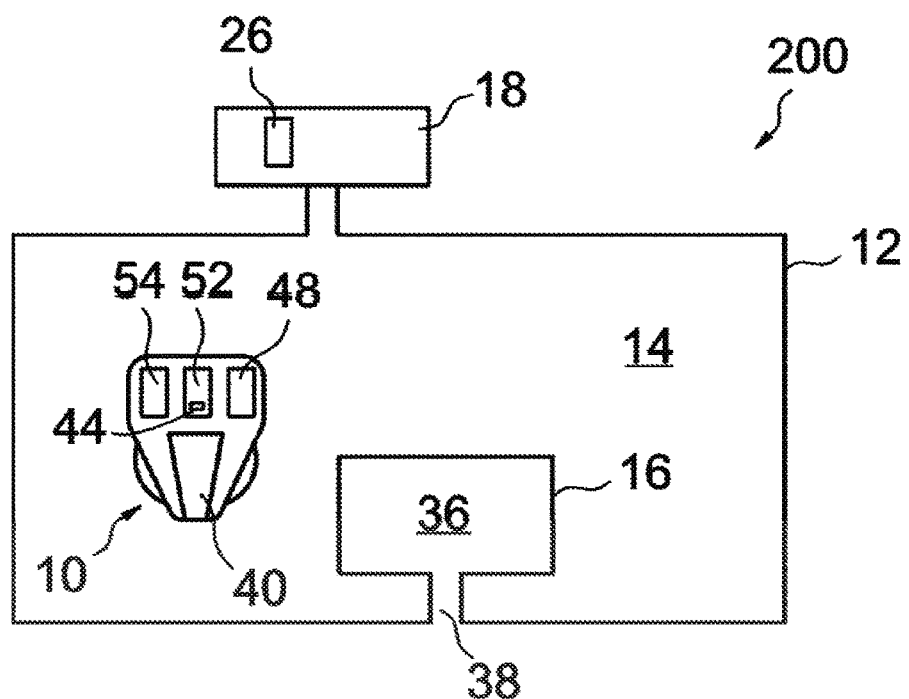

FIGS. 1 and 2 each show a possible embodiment of a system 200 according to the disclosure, composed of a mobile robotic vehicle 10, which is located inside a zone 14, in particular a work zone, defined by a boundary conductor 12. The boundary conductor 12 is realized as a wire in the form of a conductor loop, such that defined on the inside thereof there is a zone 14, in particular a work zone that is to be worked by the robotic vehicle 10, and that is not to be exited by the mobile robotic vehicle. Preferably, the boundary conductor 12 is recessed into the ground or laid and/or applied directly thereon. If the mobile robotic vehicle 10 reaches the boundary conductor 12, it is intended, advantageously, that a function is executed in the autonomous robotic vehicle 10. This function may be, for example, a change of the direction of travel, in particular a reversal of the direction of travel, a change of parameters relating to working of the zone 14 being traveled, an emergency-stop function, or the like.

The boundary conductor 12 is connected to a generator 18 for generating an electric current 20. Preferably, a current signal 20' (cf. FIG. 4c) is generated, as described in the following, by use of a boundary signal 22 (cf. FIG. 4a), provided by the current generator 18, that corresponds, in particular, to a periodic pseudo-random binary 5-bit signal sequence 24. The pseudo-random binary signal sequence 24 of the boundary signal 22 in this case is generated by means of a random-number generator 26. Furthermore, the pseudo-random binary boundary signal 22 is Manchester-encoded.

Particularly advantageously, in the method according to the disclosure, the electric current 20 and/or the pseudo-random boundary signal 22 is amplitude-modulated with a modulation signal 28 (cf. FIG. 4b), such that the resulting current signal 20' fed into the boundary conductor 12 has a time-dependent amplitude characteristic altered according to the modulation signal 28. Preferably, this modulation is performed by multiplication or addition from the original boundary signal 22 and/or the electric current 20 and the modulation signal 28.

The flow of current in the boundary conductor 12, in particular the fed-in amplitude-modulated current signal 20', has the effect that a time variable electromagnetic field 30 is realized around the boundary conductor 12, the strength and direction of the magnetic field component 32 being dependent on the current intensity and direction of flow of the current signal 20' fed into the boundary conductor 12. There consequently results, in particular, an electromagnetic field 30, which has a magnetic field component 32 (cf. FIG. 6), and which corresponds to the current signal 20' fed into the boundary conductor 12 and which is consequently likewise modulated.

Owing to the loop form of the boundary conductor 12, the magnetic field lines 58 of the magnetic field 32 in the entire inner zone 14 defined by the boundary conductor 12 are rectified in a first direction (cf. FIG. 6; this, however, only applies in the plane spanned by the boundary conductor 12), whereas the magnetic field lines 58 outside the boundary conductor 12 go in a second direction that is rotated by 180° relative to the first direction. The electromagnetic field 30, in particular the magnetic field strength H thereof (cf. FIG. 6), emitted by the current-carrying boundary conductor 12 decreases proportionally with radial distance from the boundary conductor 12 and with decreasing current intensity I in the boundary conductor 12.

Represented in FIG. 2 is a further design of the zone 14, in which, defined inside the zone 14, by means of a further loop 16 of the boundary conductor 12, there is an island zone 36 that is intended not to be worked by the autonomous robotic vehicle 10. In particular, a portion 38 of the boundary conductor 12 that, as here, connects the island zone 36 to the outer edge of the zone 14 and has two wire lines of the boundary conductor 12 in close proximity to each other, may be invisible due to interference effects, since the generated magnetic alternating field 32 may be mutually extinguishing.

Figure 3:
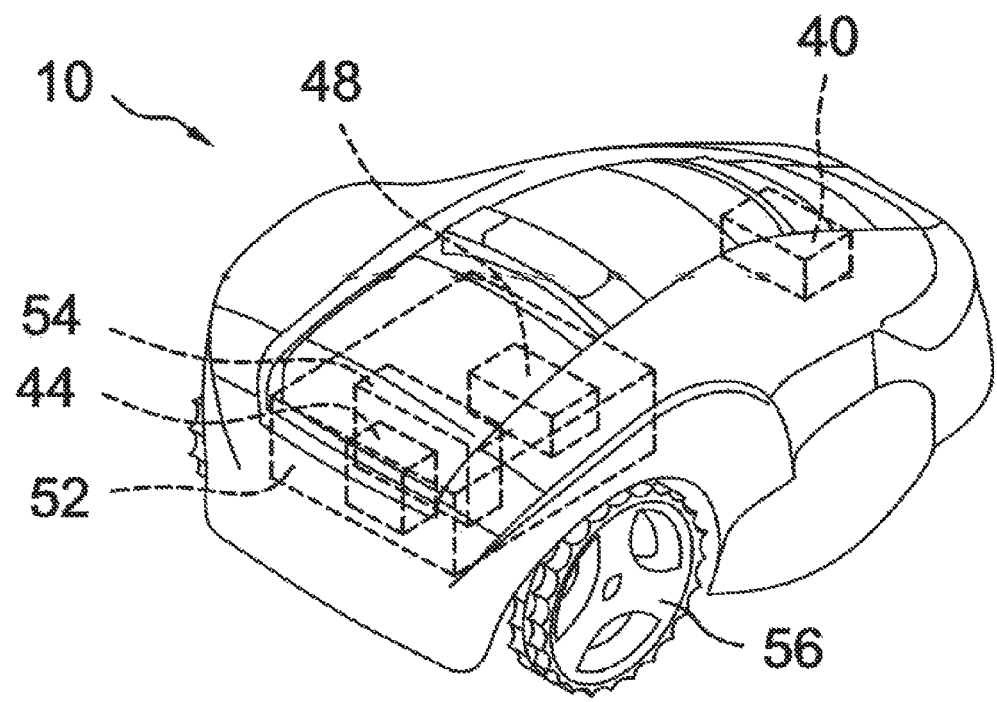

The robotic vehicle 10 represented schematically in FIGS. 1 and 2, and in greater detail in a perspective view in FIG. 3, has at least one detector unit 40, in order to detect the electromagnetic field 30, in particular the magnetic component 32 thereof and the direction of the latter, generated by the boundary conductor 12. Preferably, the detector unit 40 is formed by means of at least one induction coil, in which a, in particular time variable, electromagnetic field 30, in particular the time variable magnetic component 32 thereof (cf. FIG. 4d), induces a voltage. This induced voltage is output, as a receive signal (not represented in greater detail) by the detector unit 40 and forwarded, advantageously, to an evaluation unit 44.

The evaluation unit 44, for the purpose of evaluating receive signals supplied by the detector unit 40, analyzes the receive signal delivered by the detector unit 40 and, from the receive signal, reconstructs the boundary signal 22 fed into the boundary conductor 12, such that a reconstructed boundary signal 46 (cf. FIG. 4e,f) is obtained. Since induction coils can only detect variations of the magnetic field 32 as voltage peaks, in the evaluation unit 44 the voltage peaks are interpreted, according to their positive/negative sign, as level-change signals. Advantageously, with use of a binary boundary signal 22, voltage peaks of the receive signal can be interpreted as level changes. In this way, the evaluation unit 44 reconstructs in the mobile robotic vehicle 10 the boundary signal 22 provided to the current generator 18, and provides this, in particular provides this to the evaluation unit 44, as a reconstructed boundary signal 46 for further processing.

The mobile robotic vehicle 10 additionally has a reference-signal generator 48, which generates a reference signal 50 (cf. FIG. 4g) that in the signal sequence—here, in the periodic sequence of binary levels—corresponds substantially to the boundary signal 22 defined by the boundary-signal generator 26. In one exemplary embodiment, the reference-signal generator 48 comprises at least one storage unit and one storage read-out unit, which serves to read out the reference signal stored on the storage unit, and to forward it to another component of the autonomous robotic vehicle 10, in particular to the evaluation unit 44. There is not necessarily a time synchronization of the reference signal 50 with the boundary signal 22, at least at the instant at which the mobile robotic vehicle 10 is switched on.

In an exemplary embodiment, the boundary-signal generator 26, realized as a random-number generator, and the reference-signal generator 48 in the mobile robotic vehicle 10 generate substantially identical signals —boundary signal 22 and reference signal 50—which each, as pseudo-random signals, consist of a pseudo-random signal sequence, which is the same for the boundary signal 22 and the reference signal 50, of a predefined number of bits (also known as "pseudo-random nose" or also "pseudo-random binary signal"). The pseudo-random signals 22,50 are preferably provided periodically. The signals, which are generated in the boundary-signal generator 26 and in the reference-signal generator 48 are not necessarily synchronized in relation to each other, and there is neither an explicit start instant nor a start pattern.

In an alternative embodiment, it may be provided that the signals 22,50 generated in the boundary-signal generator and in the reference-signal generator 48 are time-synchronized. This may be realized, for example, if the time-dependent characteristic of the boundary signal 22, which, according to the disclosure, is fed into the boundary conductor 12 as an amplitude-modulated current signal 20' by the current generator 18, starts over after a time period that corresponds to the phase length of the modulation signal 28. For example, this reset may be effected parallel to the rising flank of the high-amplitude signal portion of the modulation signal 28, such that, upon commencement of each high-amplitude signal portion, in particular with each periodically recurring high-amplitude signal portion, the boundary signal 22 likewise starts anew. Advantageously, the commencement of each high-amplitude signal portion of the receive signal can thus be understood as a timing generator, which enables the reference signal 50 to be synchronized to the reconstructed boundary signal 46.

Furthermore, the mobile robotic vehicle 10 has a control device 52 for controlling the various components of the robotic vehicle 10, at least for controlling the detector unit 40, the evaluation unit 44, a drive unit 54 and the reference-signal generator 48. The control device 52 is additionally intended to set a change of direction of the robotic vehicle 10 in dependence on the identified position of the robotic vehicle 10, i.e. in particular, in dependence on an evaluation result of the evaluation unit 44. The control electronics of the control device 52 comprises at least a processor unit, a storage unit and an operating program, stored in the storage unit, that is executed during the control operation.

The autonomous robotic vehicle 10 additionally has a drive unit 54, which is intended to receive control signals from the control device 52 and, on the basis of these control signals, to effect a movement of the robotic vehicle 10. In particular, the drive unit 54 has at least one motor, and wheels 56, which the robotic vehicle 10 uses to move over the zone 14.

The energy supply device (not represented in greater detail) serves to supply energy to the autonomous robotic vehicle 10.

Figure 4:
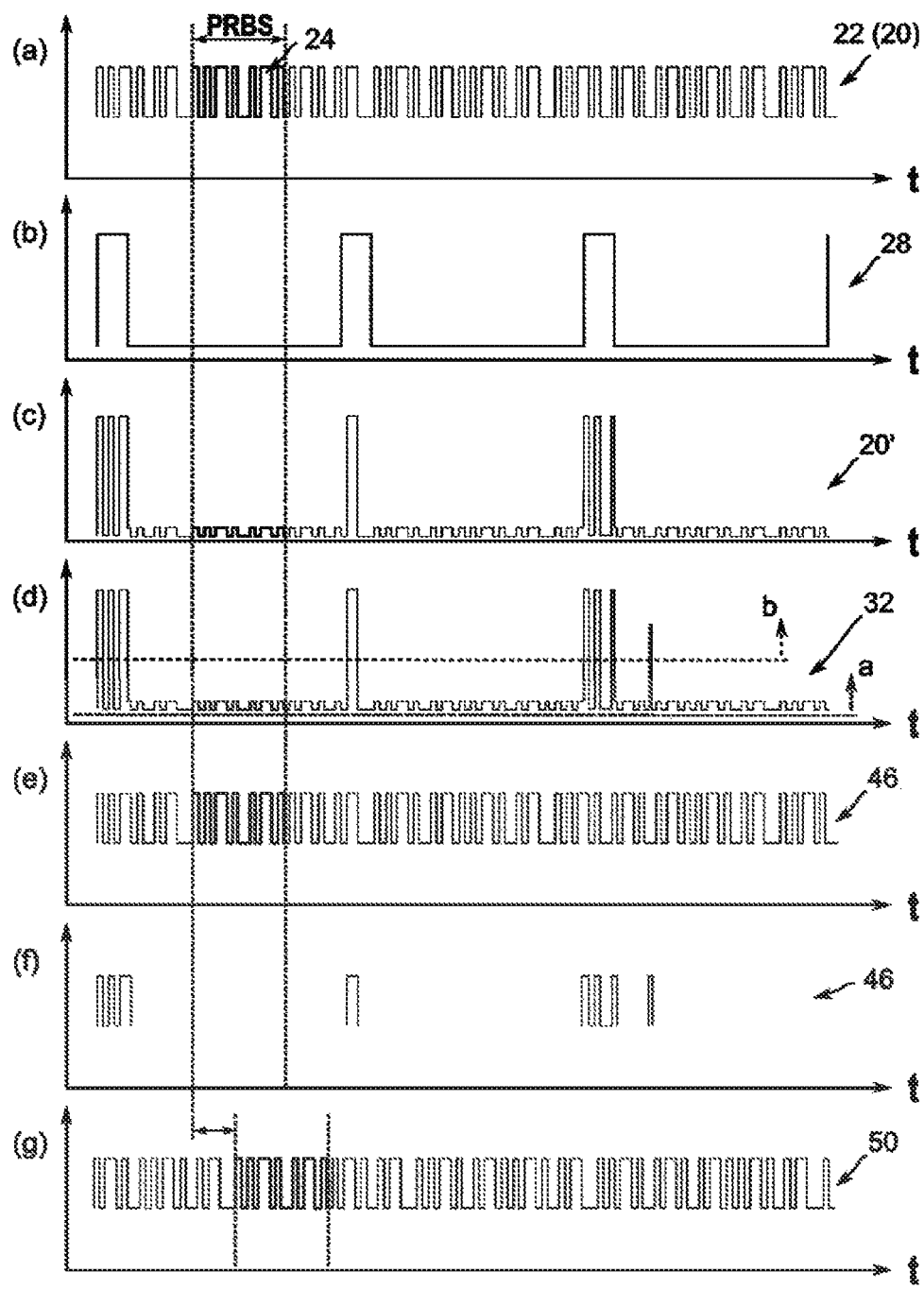

Represented exemplarily in FIG. 4 are highly simplified time-dependent characteristics for
  a) a periodic binary boundary signal 22 (alternatively, also, a current 20 generated by use of a periodic binary boundary signal 22),
  b) a modulation signal 28 according to the disclosure,
  c) an amplitude-modulated current signal 20' fed into, or to be fed into, the boundary conductor, which signal is amplitude-modulated by amplitude modulation of the boundary signal 22 or, alternatively, of the electric current 20,
  d) a field strength of the magnetic field component 32 that is to be measured by the detector unit 40 of the mobile robotic vehicle 10,
  e) a reconstructed boundary signal 46, such as that which results when the robotic vehicle 10 is in direct proximity to the boundary conductor 12 (cf. FIG. 5a),
  f) a reconstructed boundary signal 46, such as that which results when the robotic vehicle 10 is at a greater distance from the boundary conductor 12 (cf. FIG. 5b), and
  g) a reference signal 50 provided by a reference-signal generator 48 of the mobile robotic vehicle 10.

It is to be pointed out, in particular, that FIG. 4a-g shows idealized time-dependent characteristics that do not take account of time offsets of the signals in relation to one another, which may be due, for example, to a technical conversion (in particular, for example, capacitive or inductive effects).

FIG. 4a shows a boundary signal 22 that is generated by the boundary-signal generator 26 and that serves as a basis for the current signal 20' to be fed into the boundary conductor 12. The boundary signal 22 consists of a pseudo-random sequence of binary bits, portions of the pseudo-random bit pattern being identical with portions of the inverse pseudo-random bit pattern, in which logic levels of the bit pattern are respectively inverted only for a length of time that does not exceed a predefined proportion with respect to the length of the total bit pattern. In one embodiment, preferably, the pseudo-random bit pattern may be generated by use of a linearly coupled shift register. In an alternative embodiment, the signal represented in FIG. 4a may also be a current 20 generated by use of a periodic binary boundary signal 22 (signal conversion of the boundary signal 22 into a technical current 20).

FIG. 4b shows a modulation signal 28 according to the disclosure, which is realized, exemplarily, as a periodic step function having two amplitude levels other than zero, which preferably differ from each other by a factor greater than 100 and which each define a signal portion. Particularly advantageously, the durations of the signal portions have been selected such that the high-amplitude signal portion has a short duration in comparison with the low-amplitude signal portion. Particularly preferably, the high-amplitude signal portion has been selected to be shorter, by a factor of approximately 8-20, than the low-amplitude signal portion. In an exemplary embodiment, in particular, for example the high-amplitude signal portion may have a duration of 5-10 ms, whereas the low-amplitude signal portion has 80-100 ms.

Represented in FIG. 4c is the time characteristic of a current signal 20' that is amplitude-modulated by amplitude modulation of the boundary signal 22 or, alternatively, of the electric current 20 and fed into the boundary conductor 12. A continuously transmitted signal 20', without pauses, is shown, having two signal portions, corresponding to the modulation signal 28 from FIG. 4b: a short-duration, high-amplitude signal component and a long-duration, low-amplitude component. In particular, the amplitudes and durations of the signal portions have been selected in such a manner that the time-averaged current of the fed-in current signal 20' on the boundary conductor 12 is less than 1000 mA, preferably less than 500 mA. According to the disclosure, the signal 20', in its total time-dependent characteristic, has a signal sequence that corresponds to that of the boundary signal 22.

The theoretical time-dependent characteristic of the electromagnetic field 30 generated in the boundary conductor 12, in particular the field strength of the magnetic field component 32, corresponds to the characteristic of the current signal 20', and is shown in FIG. 4d. Disturbance signals are indicated, as brief signal excursions. In particular, signal portions of high current-amplitude of the fed-in amplitude-modulated current signal 20' (cf. 4c) on the boundary conductor 12 generate magnetic fields 32 of greater field strength, and consequently of greater range, whereas signal portions of low current-amplitude generate short-range electromagnetic fields 30. By means of the amplitude modulation according to the disclosure, identification of the position of the mobile robotic vehicle 10 relative to the boundary conductor 12 surrounding the defined zone 14 is thus ensured in a large (geometrical) zone 14, with reduction, according to the disclosure, of the mean energy and/or power required to generate the electromagnetic field 30. The broken lines (a,b) in FIG. 4d each represent signal thresholds that must be exceeded by the magnetic field strength in order to be detected by the detector unit 40.

The signal threshold a in this case denotes the magnetic field strength, i.e. the signal intensity, above which the robotic vehicle 10 in direct proximity (cf. FIG. 5a) to the boundary conductor 12 detects a magnetic field variation. Owing to the short distance between the robotic vehicle 10 and the boundary conductor 12, the detector unit 40 itself can detect the weak magnetic field strengths of the magnetic field component 32 generated from the low-amplitude signal portions of the fed-in current signal 20', such that detection of the underlying boundary signal 22 is possible for the entire time-dependent characteristic represented.

By contrast, the signal threshold b represents the magnetic field strength above which the robotic vehicle at a greater distance (cf. FIG. 5b) from the boundary conductor 12 detects a magnetic field variation. Owing to the greater distance, only a reduced proportion of the emitted electromagnetic field 30 is detectable when the robotic vehicle 10 is at a greater distance from the boundary conductor 12. In particular, owing to the greater distance, only the long-range portion of the electromagnetic field 30, having a high signal strength, can be detected. This means that, for the identification of the position of the robotic vehicle 10 when the robotic vehicle 10 is at a greater distance from the boundary conductor 12, it is only the high-amplitude signal portions of the current signal 20' fed into the boundary conductor 12 that are relevant and useful. Possible amplitudes of the high-amplitude signal portion of the current signal 20' fed into the boundary conductor are, for example, 1-5 A, preferably 1-4 A, whereas low-amplitude signal portion have an amplitude of, for example, 10-50 mA.

Thus, whereas, at a greater distance, only high-amplitude signal portions are used for determining the position, when the robotic vehicle 10 is at a short distance from the boundary conductor 12 the entire time-dependent characteristic of the signal 22 can be reconstructed and used. This results in an increased time resolution of the method for identifying the position of the robotic vehicle 10 with respect to the boundary conductor 12 defining the zone 14 in the case of the robotic vehicle 10 being at a short distance from the boundary conductor 12. Particularly advantageously, precise tracing of the boundary conductor 12 by the robotic vehicle 10 can thereby be achieved, for example for the purpose of ascertaining the zone 14 defined by the boundary conductor 12, in particular the limits thereof, in the context of mapping the zone 14.

Figure 5:
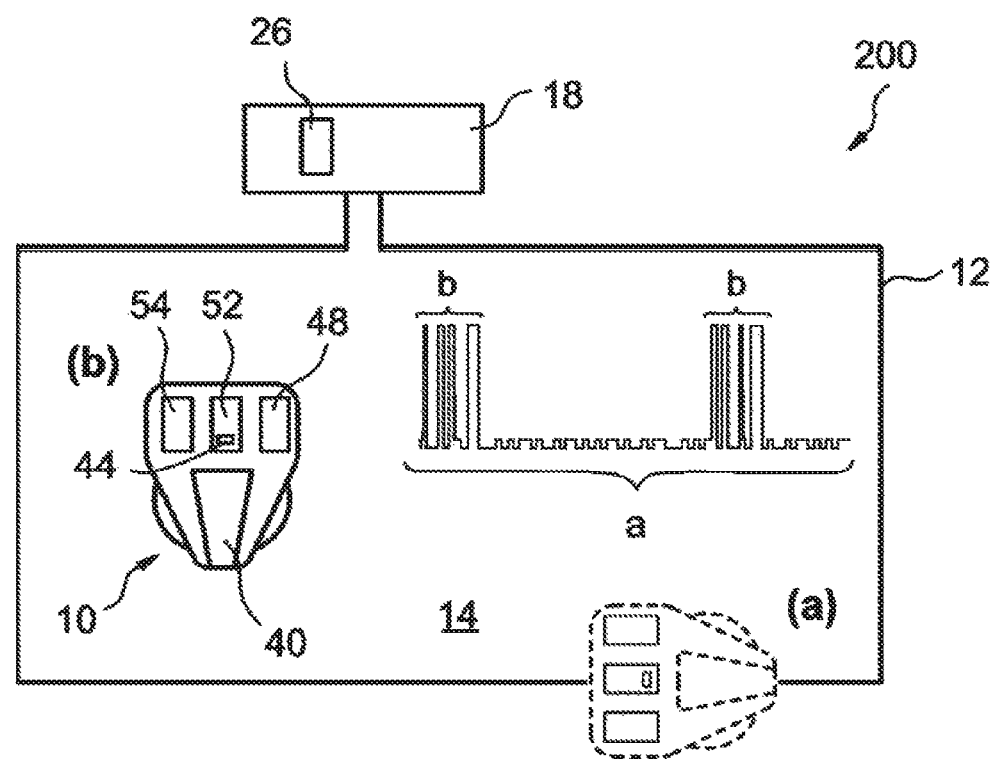

FIGS. 4e and 4f show boundary signals 46, reconstructed from the receive signal and each subject to slight interference, for a robotic vehicle 10 in direct proximity to the boundary conductor 12 (cf. FIG. 5a), and for a robotic vehicle 10 located at a great distance (cf. FIG. 5b). In accordance with the discussed signal thresholds, the measured receive signals of the detector unit 40, and consequently the reconstructed boundary signals 46, differ.

Represented in FIG. 4g, in conclusion, is a reference signal 50, such as that generated by means of the reference-signal generator 48. Since the reference-signal generator 48 generates the reference signal 50 in the same way as the boundary-signal generator 26 generates or, alternatively, reads out from a storage unit a stored signal sequence that corresponds to the bit pattern of the boundary signal 22, the reference signal 50 has the same sequence of bits, having the same signal frequency, as the boundary signal 22. Since the boundary signal 22 and the reference signal 50 are not necessarily synchronized, the reference signal 50 and the boundary signal 22 are shown as having been shifted by a time offset relative to each other.

Figure 6:
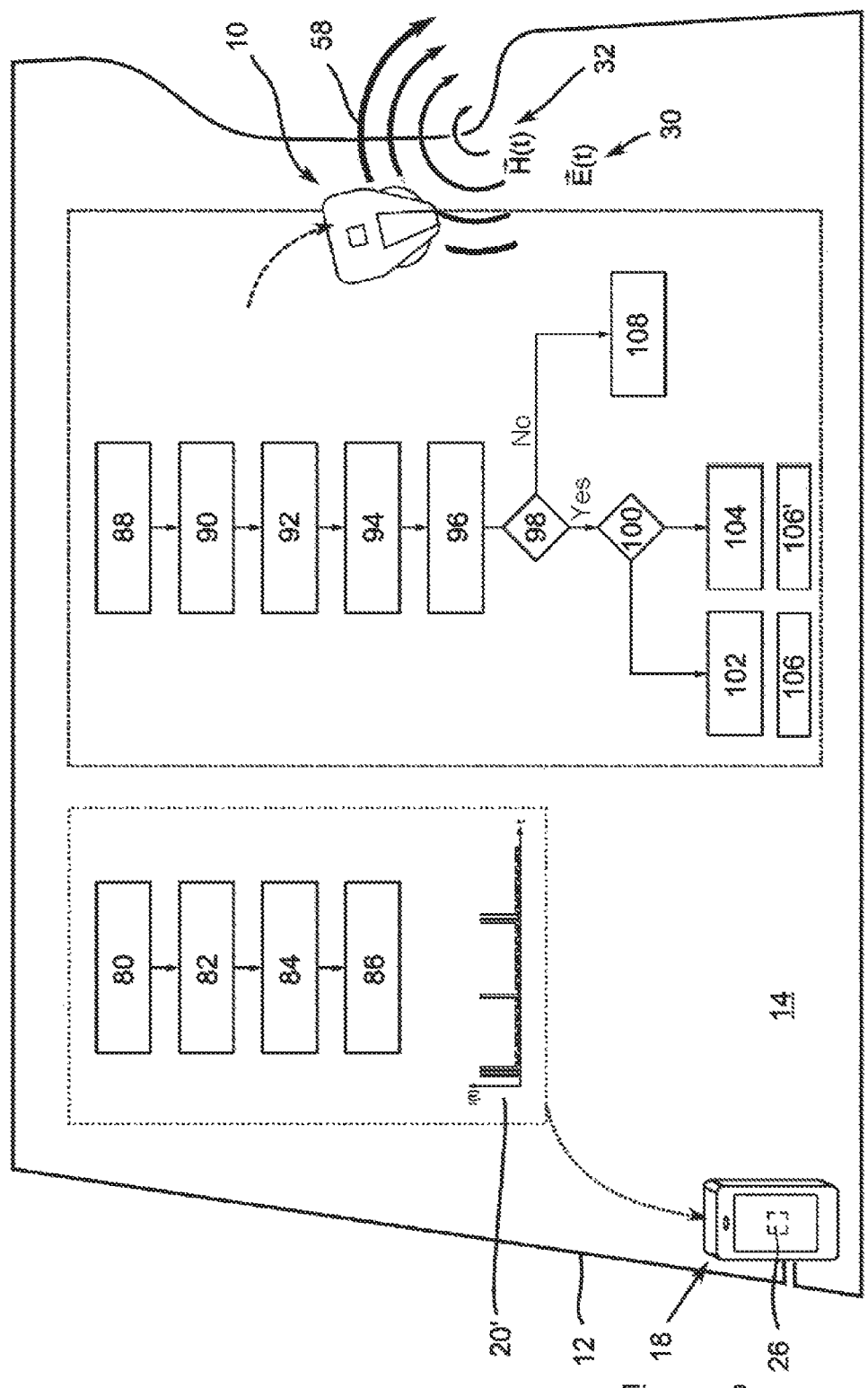

The method for identifying the position of the robotic vehicle 10 with respect to the zone 14, i.e. for identifying whether the robotic vehicle 10 is inside or outside the zone 14 defined by the boundary conductor 12, is described in the following in connection with the flow diagram of FIG. 6.

Firstly, in the method step 80, a boundary signal 22, which is amplitude-modulated in method step 82 by use of a modulation signal 28, is generated by means of the boundary-signal generator 26, in particular the random-number generator. This amplitude-modulated boundary signal 22' is converted by the current generator 18, in step 84, into an electric current signal 20' and fed into the boundary conductor 12, such that immediately afterwards a time variable electromagnetic field 30 is generated in the surroundings of the boundary conductor (step 86). FIG. 6 shows exemplary magnetic field lines 58, which spread out, in a time variable manner, concentrically around the boundary conductor 12.

The time variable electromagnetic field 30, in particular a time variable magnetic field component 32, is detected in method step 88 by means of the detector unit 40, in particular a coil device, with a receive signal being generated, and is forwarded to the evaluation unit 44 (step 90). After the receive signal has been received by the evaluation unit 44, in step 92 the boundary signal 22 on which the electromagnetic field variation is based is reconstructed, as the boundary signal 46, from the receive signal. According to step 94, the reference signal 50 generated by the reference-signal generator 48 is provided to the evaluation unit 44. The reconstructed boundary signal 46 is thereupon correlated with the reference signal 50 in the evaluation unit 44, in step 96. In method step 98, it is interrogated whether the reference signal 50 and the reconstructed boundary signal can be correlated to each other, i.e. whether the maximum or minimum correlation value that is obtained as a maximum or minimum of the correlation values calculated for various time offsets between a reconstructed boundary signal and a reference signal permits an unambiguous statement about the correlation, i.e., in particular, lies above or below a defined limit value. If this is the case ("Yes"), then the robotic vehicle 10 is coordinated with the boundary-signal generator 26, and it is ascertained in the following method step 100, by means of an interrogation of the result of a correlation calculation, in particular by means of an interrogation of the calculated correlation value, whether the robotic vehicle 10 is inside (step 102) or outside (step 104) the zone 14 defined by the boundary conductor 12. The result of the correlation calculation then undergoes appropriate further processing in method step 106 or 106', and is preferably used to perform or maintain particular functions of the robotic vehicle 10, particularly preferably to maintain or change the direction of movement.

If, in method step 98, there is no correlation ("No"), i.e. the reference signal 50 and the reconstructed boundary signal 46 cannot be correlated to each other, an emergency function, for example stoppage of the robotic vehicle 10, is triggered in step 108.

The invention claimed is:

1. A method for identifying a position of an autonomous robotic vehicle relative to a boundary conductor surrounding a defined zone, the method comprising:
providing a pseudo-random boundary signal and a modulation signal;
generating a pseudo-random current signal based on the pseudo-random boundary signal, which is amplitude-modulated with the modulation signal such that the pseudo-random current signal is amplitude-modulated;
feeding the pseudo-random current signal to the boundary conductor to generate an alternating electromagnetic field;
detecting magnetic field variations that originate from the alternating electromagnetic field based on a voltage induced by the magnetic field variations, and generating a receive signal from the magnetic field variations;
evaluating the receive signal to generate a reconstructed boundary signal;
providing a reference signal that is substantially identical to the pseudo-random boundary signal;

executing a correlation-based pattern recognition to ascertain a correlation value between the reference signal and the reconstructed boundary signal; and determining the position of the autonomous robotic vehicle at least one of inside the defined zone and outside the defined zone based on the ascertained correlation value.

2. The method as claimed in claim 1, wherein the modulation signal has at least one first signal portion that has a first amplitude, and a second signal portion that has a second amplitude, wherein the first amplitude differs from the second amplitude by a factor that is greater than 10.

3. The method as claimed in claim 2, wherein the first signal portion of the modulation signal is of a shorter duration than the second signal portion of the modulation signal by a factor of 5.

4. The method as claimed in claim 1, wherein the modulation signal is a periodic modulation signal.

5. The method as claimed in claim 1, wherein the modulation signal corresponds at least partly to at least one of a step function, a rectangle function, a discontinuous function, and a signal approximation of one of these functions.

6. The method as claimed in claim 1, wherein the modulation signal is time-dependent and is non-zero.

7. The method as claimed in claim 1, further comprising:
selecting the modulation signal in such a manner that the pseudo-random current signal provided in the boundary conductor is on average less than 1000 mA.

8. The method as claimed in claim 1, wherein the pseudo-random boundary signal is a binary signal having a quasi-random sequence of binary levels, and has a periodic bit pattern that is selected such that a length of a portion of the periodic bit pattern that is identical to a portion of an inverted bit pattern of equal length, is less than a predefined proportion with respect to the total length of the periodic bit pattern.

9. The method as claimed in claim 1, wherein the pseudo-random boundary signal is a Manchester-encoded binary signal having a quasi-random sequence of binary levels, and has a periodic 5-bit bit pattern in which a timing frequency is 5 kHz.

10. The method as claimed in claim 1, further comprising:
resetting the pseudo-random boundary signal after a time period that corresponds to a phase length of the modulation signal.

11. The method as claimed in claim 1, further comprising:
ascertaining a time correlation offset between the reference signal and the reconstructed boundary signal by (i) determining a plurality of correlation values for various time offsets, and (ii) determining the time correlation offset as the time offset for the correlation value that is greatest in amount.

12. The method as claimed in claim 1, further comprising:
triggering at least one function at the autonomous robotic vehicle based on the position of the autonomous robotic vehicle relative to the boundary conductor.

13. The method as claimed in claim 12, the triggering further comprising:
triggering the at least one function at the autonomous robotic vehicle in response to the position of the autonomous robotic vehicle indicating an exit from the defined zone.

14. The method as claimed in claim 1, wherein movement of the autonomous robotic vehicle is only allowed inside the defined zone surrounded by the boundary conductor, the method further comprising:

effecting, in a case of the boundary conductor being reached by the autonomous robotic vehicle, a change of direction of the autonomous robotic vehicle.

15. The method as claimed in claim 1, further comprising:
executing a change of direction of the autonomous robotic vehicle in a direction of the boundary conductor in response to the position of the autonomous robotic vehicle relative to the boundary conductor is identified as being one of inside the defined zone and outside the defined zone.

16. An autonomous robotic vehicle that identifies its position relative to a boundary conductor surrounding a defined zone, the autonomous robotic vehicle comprising:
a detector unit configured to detect magnetic field variations generated by a pseudo-random current signal that is fed into in the boundary conductor, the pseudo-random current signal being generated based on a provided pseudo-random boundary signal and being amplitude-modulated with a modulation signal such that the pseudo-random current signal is amplitude-modulated, the detector unit being configured to generate a receive signal from the detected magnetic field variation;
a reference-signal generator configured to provide a reference signal having a bit pattern that is substantially identical to a bit pattern of the provided pseudo-random boundary signal; and
an evaluation unit configured to:
evaluate the receive signal generate a reconstructed boundary signal;
execute a correlation-based pattern recognition method to ascertain a correlation value between the reference signal and the reconstructed boundary signal; and
determine the position of the autonomous robotic vehicle relative to the boundary conductor at least one of inside the defined zone and outside the defined zone based on the ascertained correlation value.

17. A system comprising:
a boundary conductor surrounding a defined zone;
a signal generator configured to generate a pseudo-random current signal in the boundary conductor based on a pseudo-random boundary signal, which is amplitude-modulated with a modulation signal such that the pseudo-random current signal is amplitude-modulated; and
an autonomous robotic vehicle comprising:
a detector unit configured to detect magnetic field variations generated by the pseudo-random current signal in the boundary conductor, the detector unit being configured to generate a receive signal from the detected magnetic field variation;
a reference-signal generator configured to provide a reference signal having a bit pattern that is substantially identical to a bit pattern of the provided pseudo-random boundary signal; and
an evaluation unit configured to:
evaluate the receive signal generate a reconstructed boundary signal;
execute a correlation-based pattern recognition method to ascertain a correlation value between the reference signal and the reconstructed boundary signal; and
determine a position of the autonomous robotic vehicle relative to the boundary conductor at least one of inside the defined zone and outside the defined zone based on the ascertained correlation value.

* * * * *